(12) United States Patent
Okuda et al.

(10) Patent No.: US 6,295,096 B1
(45) Date of Patent: Sep. 25, 2001

(54) EDGE KEY GENERATING METHOD AND EDGE KEY GENERATING APPARATUS

(75) Inventors: Nobukatsu Okuda, Neyagawa; Yoshiki Yamada, Katano, both of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/108,182

(22) Filed: Jul. 1, 1998

(30) Foreign Application Priority Data

Jul. 3, 1997 (JP) .................................................. 9-177489

(51) Int. Cl.[7] .............................. H04N 9/74; H04N 9/76; H04N 5/02; G06K 9/40; G09G 5/00
(52) U.S. Cl. ......................... 348/590; 348/591; 348/593; 348/587; 348/600; 348/625; 382/266; 382/268; 345/113; 345/115; 345/118; 345/116; 345/132
(58) Field of Search ..................................... 348/590, 625, 348/606, 631, 591, 592, 593, 597, 600, 587; 382/266, 268, 294; 345/113, 115, 116, 118, 132

(56) References Cited

U.S. PATENT DOCUMENTS

| | | | |
|---|---|---|---|
| 4,392,156 | * 7/1983 | Duca et al. | 358/183 |
| 4,409,618 | * 10/1983 | Inaba et al. | 358/183 |
| 4,447,809 | * 5/1984 | Kodama et al. | 340/747 |
| 4,646,154 | * 2/1987 | Shinohara et al. | 358/183 |
| 4,698,666 | * 10/1987 | Lake, Jr. et al. | 358/22 |
| 4,961,114 | * 10/1990 | White | 358/183 |
| 5,046,165 | * 9/1991 | Pearman et al. | 358/183 |
| 5,305,107 | * 4/1994 | Gale et al. | 348/590 |
| 5,488,421 | * 1/1996 | Hwang et al. | 348/448 |
| 5,825,433 | * 10/1998 | Yamada et al. | 348/584 |

FOREIGN PATENT DOCUMENTS

| | | |
|---|---|---|
| 60-199276 | 10/1985 | (JP) . |
| 1-212179 | 8/1989 | (JP) . |
| 7-30810 | 1/1995 | (JP) . |

* cited by examiner

Primary Examiner—Reinhard J. Eisenzopf
Assistant Examiner—Paulos M. Natnael
(74) Attorney, Agent, or Firm—Parkhurst & Wendel, L.L.P.

(57) ABSTRACT

To enable interlacing edge-generating means to be used for a progressive image signal that is separated into lines as two sequences of signals, the present invention comprises a pre-edge processing circuit (11) that executes appropriate pre-edge processing on the progressive image signal separated into lines depending on the condition of each of the two signals, and an edge generating circuit (18, 19) that executes on the two signals after pre-edge processing pre-edge generation processing similar to that for interlacing.

5 Claims, 13 Drawing Sheets

EDGE KEY GENERATING METHOD AND EDGE KEY GENERATING APPARATUS

FIELD OF THE INVENTION

The present invention relates to an edge key generating method and apparatus for generating edges for a key signal used to superimpose character or image information on an image signal.

BACKGROUND OR THE INVENTION

An image or characters may be superimposed on an image signal as special effect processing. In this case, a key signal is used that specifies the shape (range) of an image to be cut out for superimposition and the amount (intensity) of the image.

If an image contains, for example, a human being against a blue background (such an image is referred to as a 0chromakey), the key signal distinguishes that human being from the blue background. The key signal specifies a cut-out image area (for example, the area of the human being) as "1" and the blue background as "0". Edges are added to the periphery of the cut-out image area in the key signal.

A conventional edge key generating apparatus is configured as shown in FIG. 8.

In this figure, 30 is an input terminal through which an image signal for superimposition is input; 31 is a Y/C separation circuit that separates the image signal (in which, for example, a luminance signal (hereafter referred to as "Y") and a color signal (hereafter referred to as "C") are time-axis-multiplexed) into Y and C; 32 is a key signal generating circuit that generates a key signal based on the weights .of the respective signals provided by the Y/C separating circuit 31; 33 is a filter that removes ringing from the key signal; 34 is an edge generating circuit that generates (adds) edges of a desired width to the key signal from which the filter 33 has cut out harmonic components; and 35 is an output terminal through which the key signal is output to which the edges have been added.

For character superimposition, the key signal generating circuit 32 generates a key signal based on the level of Y, and if the characters have colors, a key signal is generated taking the color signal into consideration.

The edge generating circuit 34 is configured as shown in FIG. 9.

FIG. 9 is a simplified drawing of a configuration used to generate edges in the vertical direction. A key signal output from a filter 33 is input through a terminal 36. In a 1H delay circuit 37 that delays a signal by one horizontal scanning period (hereafter referred to as "1H"), the key signal is delayed by 1H. A 1H delay circuit 38 further delays the signal by 1H. Signals for three lines from the terminal 36 and 1H delay circuits 37 and 38 are input to a maximum-value selector 39 to select a signal having a maximum amplitude level, which is then output from a terminal 40.

If, for example, a key signal (the shaded part) is in the n-th line ((n) is an integer) of an image signal as shown in FIG. 10a, then in the output from the edge generating circuit 34 shown in FIG. 9, an edge is added to one line located above and below the n-th line, respectively as shown in FIG. 10b.

Specifically, in the configuration shown in FIG. 9, the edge generating circuit 34 provides a 1H delay, so when a signal for the n-th line is input to the terminal 36, the (n−1)-th line is output from the 1H delay circuit 37 and the (n−2)-th line is output from the 1H delay circuit 38. Thus, as the output of the signal of the (n−1)-th line from the maximum-value selector 39, the signal from the terminal 36, that is, the key signal is selected.

Likewise, when the (n+1)-th line is input to the terminal 36, selection is made among (n+1)-th, (n)-th, and (n−1)-th lines, and when the (n+2)-th line is input to the terminal 36, selection is made among the (n+2)-th, (n+1)-th, and (n)-th lines.

An example of a configuration of an actual edge generating circuit 34 is shown in FIG. 11.

The configuration shown in FIG. 11 can add edges to four lines above and below the key signal. A key signal is input through a terminal 41 and is sequentially delayed by 1H delay circuits 43 to 50 via a one-field FIFO memory having one field of storage capacity in order to provide signals for nine lines.

In this circuit, the output from the 1H delay circuit 46 is used as a reference line, so the signal is delayed by 4H relative to the output from the one-field FIFO memory 42. The key signal with edge addition must be timed to an image signal for superimposition. Thus, the one-field FIFO memory is adjusted to delay the signal by one-field period including the 4H delay.

The outputs from the one-field FIFO memory 42, 1H delay circuits 43 to 45, and 1H delay circuits 47 to 50 are multiplied by α1 to α8 by multipliers 51 to 58 respectively. The outputs from the multipliers 51 to 58 and 1H delay circuit 46 are input to a maximum-value selection circuit 59 to select one of the signals for nine lines which has a maximum amplitude, which is output from a terminal 61 as the key signal to which edges have been added.

A control signal is input to the maximum-value selector 59 from a terminal 60. The control signal controls the method for adding edges, that is, specifies the number of edges to be added and the addition of both upper and lower edges, only upper edges, only lower edges, or no edges. Selection among the signals for nine lines causes four edges to be added above and below the key signal, and selection among the 1H delay circuits 46 to 50 causes four edges to be added below (above?) the key signal.

In addition, coefficients α1 to α8 applied to the multipliers 51 to 58 control the method for adding edges. When, for example, α1 =0.2, α2 =0.4, α3 =0.6, α4 =0.8, α5 =0.8, α6 =0.6, α7 =0.4, and α8 =0.2, soft-edge processing is executed in which the edges added before and after the key signal (in the upper and lower parts of an image) vary on a step-by-step basis as shown in FIG. 12a. In addition, if α1 to α8 are all 1, hard edge processing is executed in which the edges added before and after the key signal are all at the same level as shown in FIG. 12b.

Since such a conventional edge key generating apparatus is designed to generate edges for an image signal for interlaced scanning as in NTSC image signals, it is not affected by gaps between edges caused by the absence of the key signal in the subsequent field as shown in FIG. 10.

Attempts, however, are now made to put to practical use television broadcasting using progressive scanned image signals. A progressive scanned image signal carries one frame of image in one conventional field, thereby, for example, doubling the number of required horizontal scanning lines.

Consequently, to reduce the required transmission band, broadcasting studios use a transmission method that separates a progressive image signal into two.

FIG. 13 shows a separation method used in transmitting a progressive image signal that is separated into two. In this figure, a frame (for example, one frame lasts one-thirtieth seconds) is divided into links A and B (a main link and a sub-link) for each horizontal scanning line. When one frame corresponds to 525 horizontal scanning lines, the positions of the links A and B are reversed during the subsequent frame. Thus, if only the signal of the link A or link B is considered, it is the same as an interlaced image signal so a conventional apparatus for interlaced image signals can be used in this case.

If, however, a conventional edge key generating apparatus is applied to each of the links A and B, although all the signals are contained in the same frame, gaps between the edges are clearly recognized, resulting in striped edges.

If, for example, the signal shown in FIG. 10 is assumed to be a progressive image signal, the lines (n) and (n+1) are signals of the link A, whereas the line between these lines is a signal of the link B within the same frame. As a result, if edges are added to the signals of the links A and B using an edge key generating apparatus, followed by multiplexing, then striped edges result as shown in FIG. 10b.

DISCLOSURE OF THE INVENTION

It is an object of this invention to provide an edge key generating method and apparatus that prevents striped edges even if progressive scanning is carried out in which an image signal is separated.

To achieve this object, this invention applies appropriate pre-edge processing to separated progressive image signals depending on their conditions and then applies conventional edge generation processing to the signals.

Thus, even when conventional edge key generating apparatuses are used, an edge key generating method and apparatus can be obtained that enables progressive image, signals to be conveniently used.

The edge key generating method according to this invention is characterized in that it comprises executing pre-edge processing that generates on a horizontal scanning line above or below a key signal a key signal equivalent to said key signal, and executing edge addition processing on the output from the pre-edge processing, that is, on each of two sequences of signals each appearing on every other horizontal scanning line.

In addition, the edge key generating method is used for progressive image signals and is characterized in that after edge addition processing on two sequences of signals, it carries out line multiplexing to obtain an progressive image signal to which edges have been added.

Furthermore, the edge key generating method is characterized in that it synthesizes the key signal prior to the pre-edge processing and the key signal after the edge addition processing.

Specifically, the edge key generating apparatus that realizes the edge key generating method comprises a pre-edge processing circuit that generates on a horizontal scanning line above or below a key signal a key signal equivalent to said key signal; a first edge generating circuit that executes edge addition processing on the output from the pre-edge processing circuit for every other horizontal scanning line; and a second edge generating circuit that executes edge addition processing on the output from the pre-edge processing circuit that is different from the input to the first edge generating circuit. This configuration enables edges to be generated in each of the two edge generating circuits even if the key signal is present in only one line.

As described above, the edge key generating method according to this invention executes the pre-edge processing that generates on a horizontal scanning line above or below a key signal a key signal equivalent to said key signal and executes edge addition processing on the output from the pre-edge processing, that is, on each of two sequences of signals each appearing on every other horizontal scanning line. Therefore, if a progressive image signal is separated into lines and edge generating circuits for interlaced image signals are used in parallel, the pre-edge processing can be used to provide an edge key free from striped edges, despite the use of progressive scanning in which the image signal is separated.

The edge key generating method according to this invention is described below based on specific embodiments.

Embodiment 1

Figure 1:
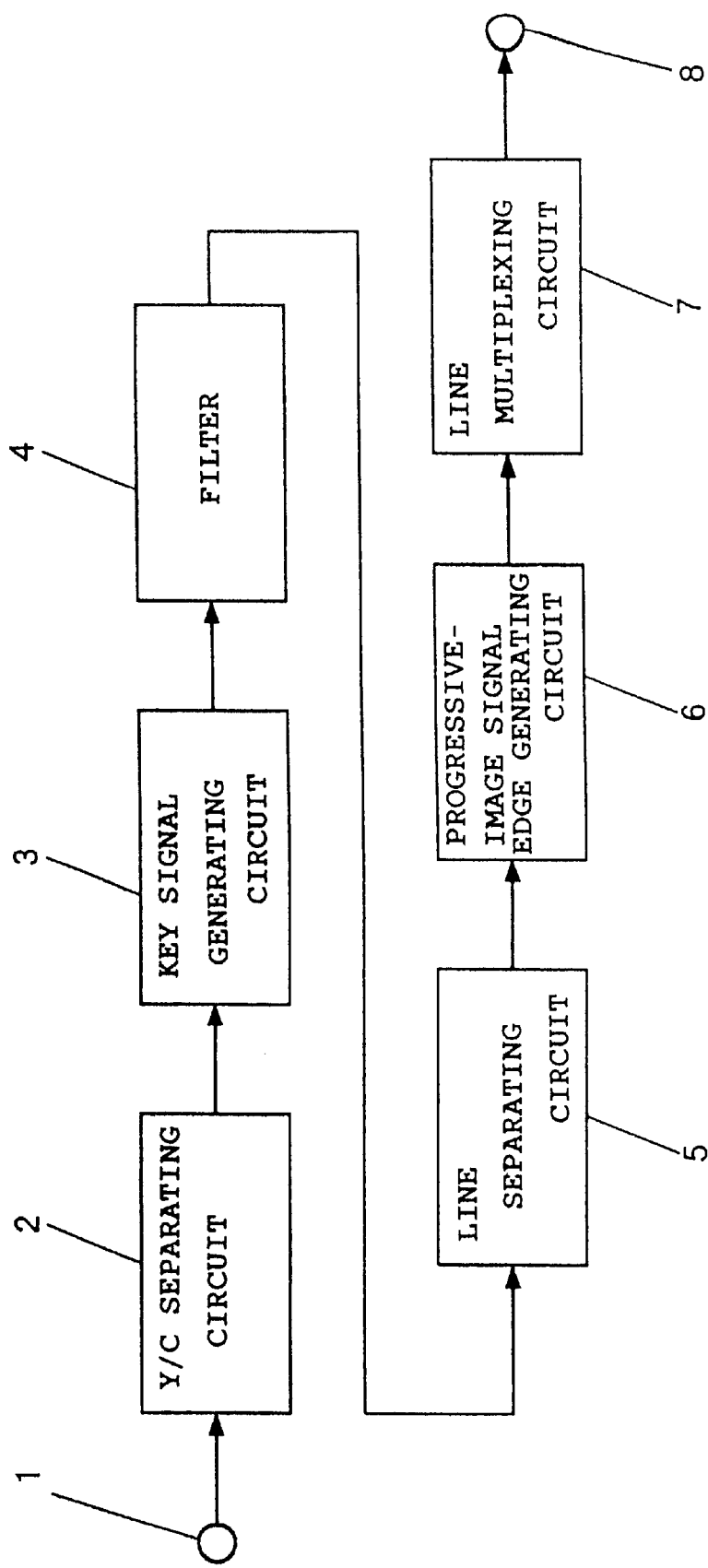
FIG. 1 shows a configuration of an edge key generating apparatus according Embodiment 1 of this invention.

FIG. 1 shows Embodiment 1 of the edge key generating apparatus according to this invention.

In this figure, 1 is an input terminal through which a progressive image signal is input on which a key signal is superimposed; 2 is a Y/C separating circuit that separates a signal from the input terminal 1; 3 is a key signal generating circuit that generates a key signal based on the output from the Y/C separating circuit 2; 4 is a filter that filters the key signal from the key signal generating circuit 3 to remove the harmonic components from the signal; 5 is a line separating circuit that separates the key signal (progressive image signal) output from the filter 4, into two signals in links A and B for each horizontal scanning line; 6 is a progressive-image signal edge generating circuit that adds edges to the separated key signals; 7 is a line multiplexing circuit that multiplexes the two key signals to which the edges have been added; and 8 is an output terminal through which a key signal with edge addition is output.

Since progressive image signals are used, the operation is almost equivalent to the conventional one up to the filter 4. Thus, the progressive image signal edge generating circuit 6 that characterizes this embodiment is described below in detail.

Figure 2:
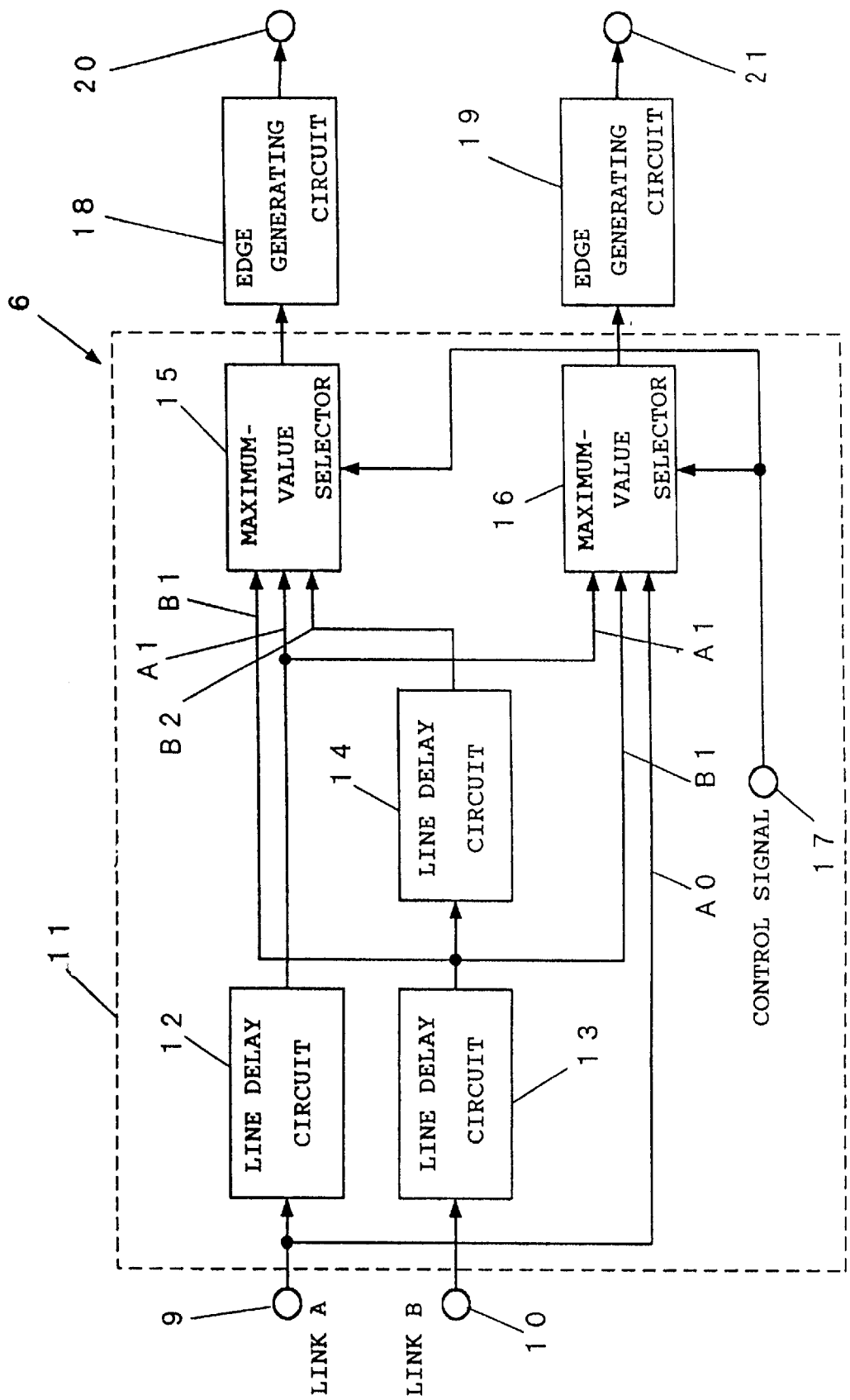
FIG. 2 shows a configuration of a progressive image signal edge generating circuit in the edge key generating apparatus.

FIG. 2 shows a configuration of the progressive-image signal edge generating circuit 6. The progressive-image signal edge generating circuit 6 consists of a pre-edge processing circuit 11 and two edge generating circuits 18 and 19.

The pre-edge processing circuit 11 consists of line delay circuits 12, 13, and 14 that delay a signal by one horizontal line time; and maximum-value selectors 15 and 16 that select one of the input signals for three lines which has a maximum value.

In FIG. 2, a signal for the link A is input through the terminal 9, while a signal for the link B is input through the terminal 10. A signal A0 for the link A is input to the maximum-value selector 16 and to the maximum-value selectors 15 and 16 via the line delay circuit 12 as a signal A1. In addition, the signal for the link B is input to the maximum-value selectors 15 and 16 via the line delay circuit 13 as a signal B1 and to the maximum-value selector 15 via the line delay circuit 14 as a signal B2.

The outputs from the maximum-value selectors 15 and 16 are input as pre-edge-processed signals of the links A and B to the edge generating circuits 18 and 19, respectively, where edges are added to the signal.

Figure 11:
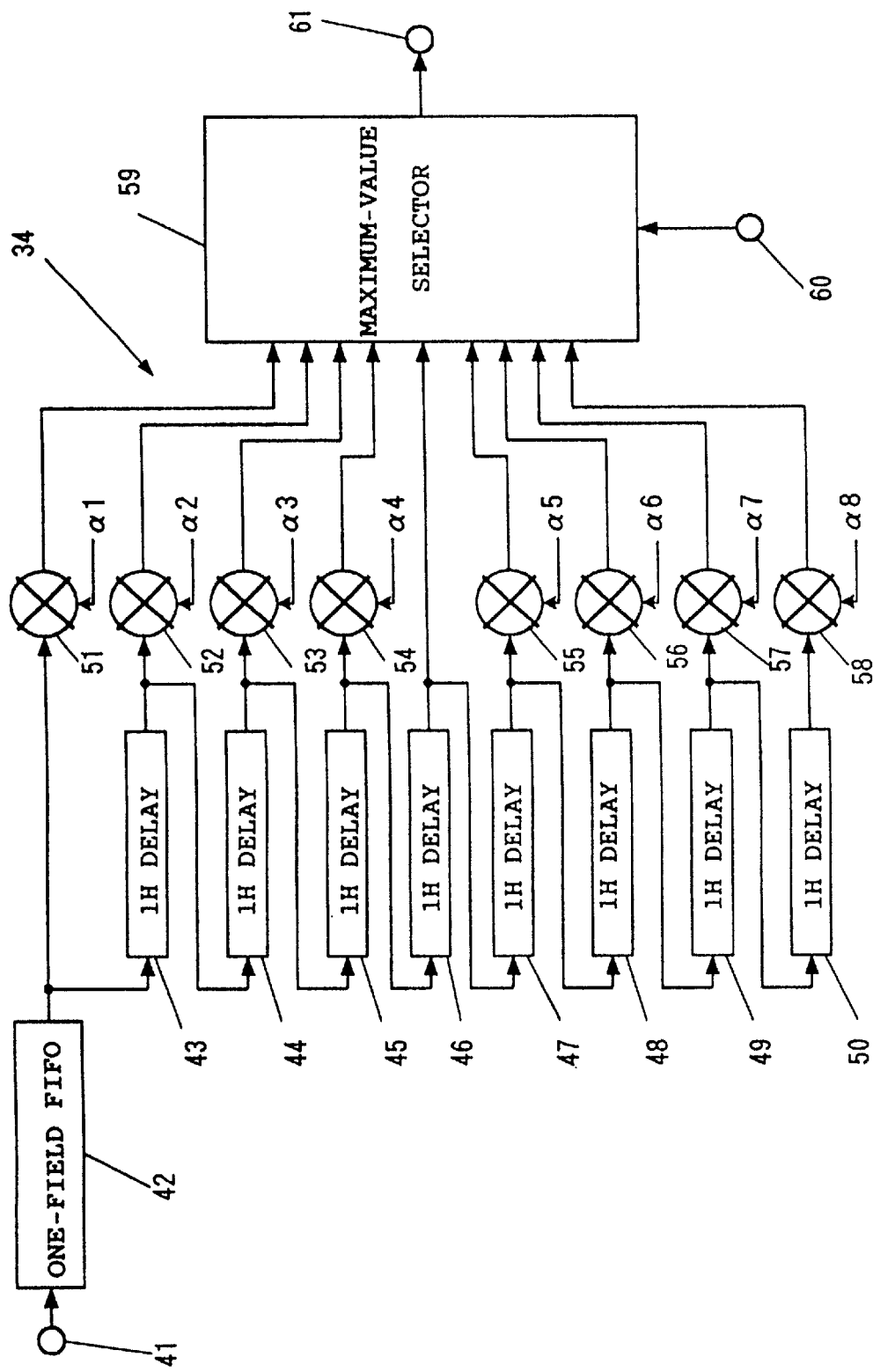
FIG. 11 shows another configuration of the edge generating circuit in the edge key generating apparatus.
Figures 12A, 12B:
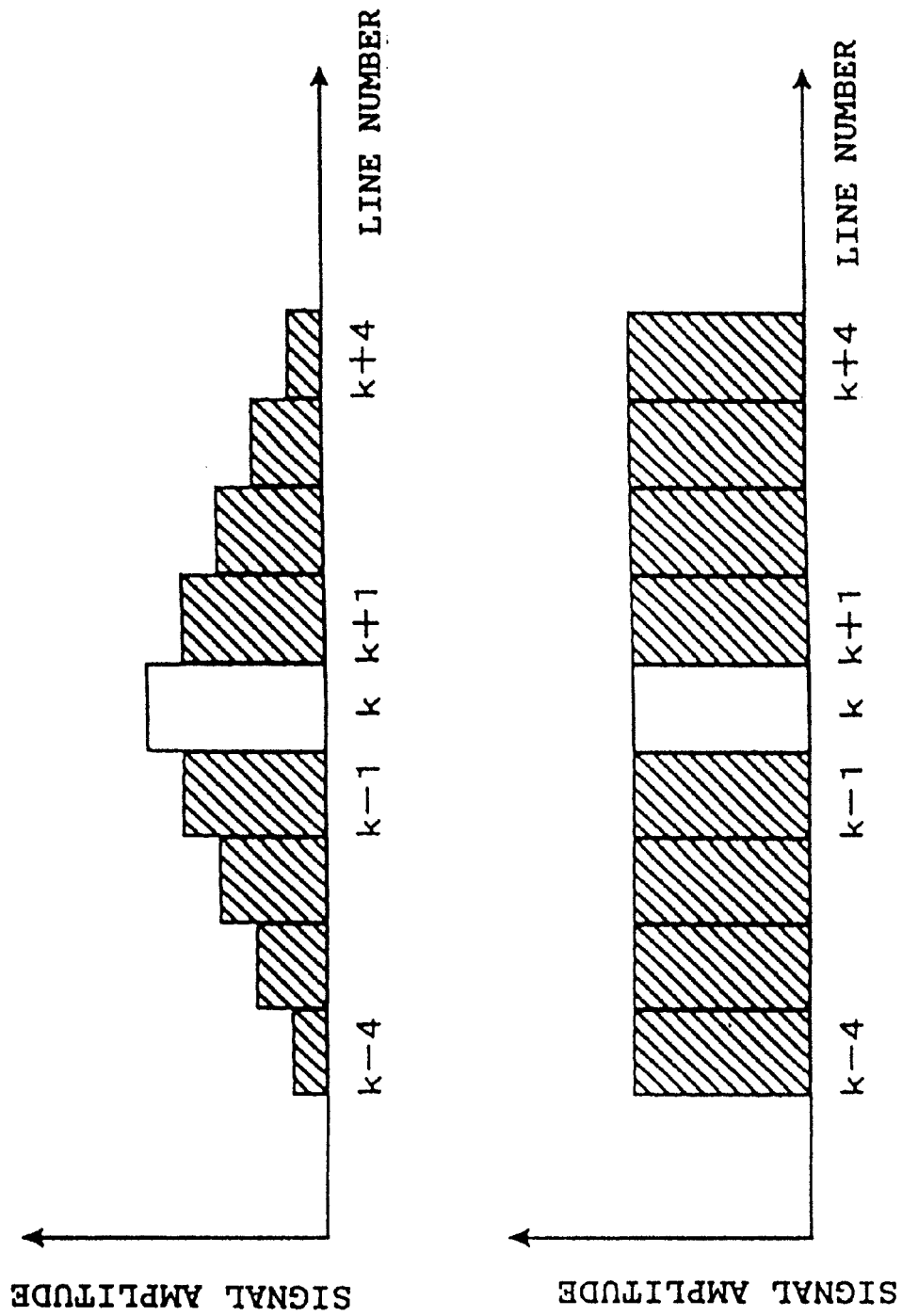
FIGS. 12a and 12b are conceptual drawings of an image signal indicating an operation of the edge key generating apparatus.
Figure 13:
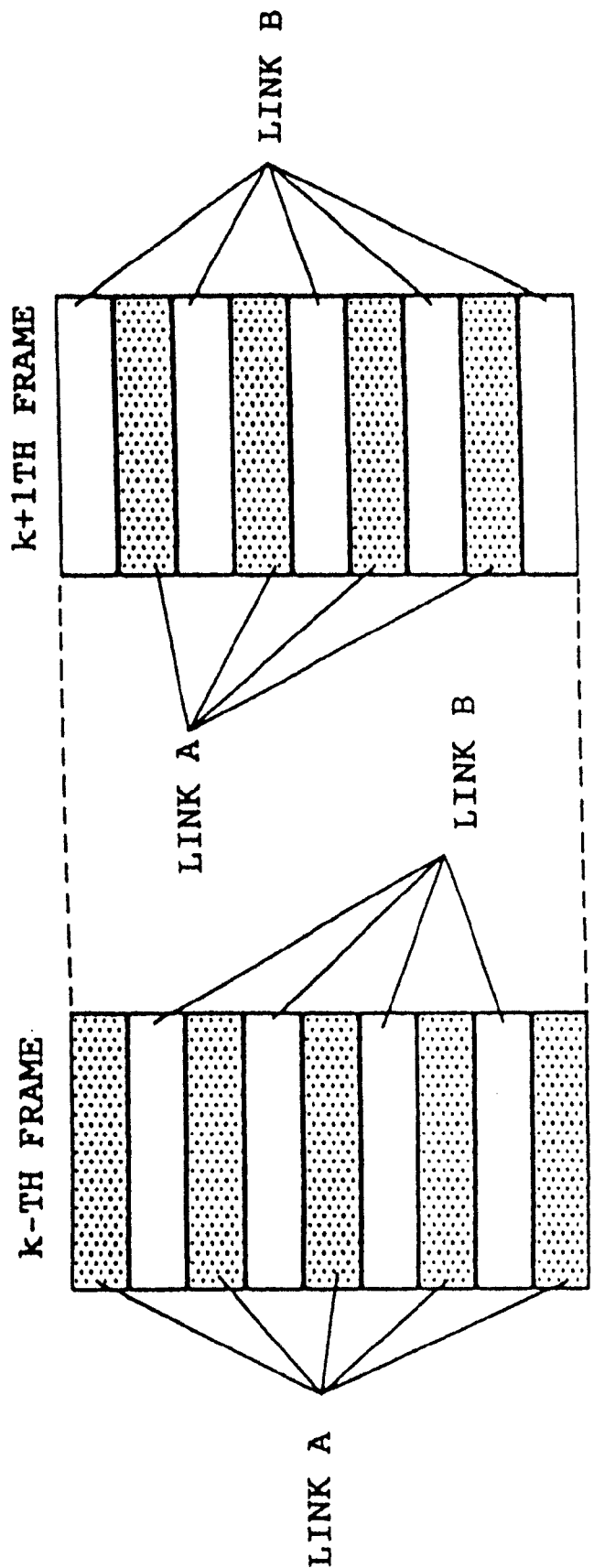
FIG. 13 is an explanatory drawing of a separation method used in transmitting a progressive image signal that is separated into two lines.

The edge generating circuits 18 and 19 are typically used for interlaced signals and are as shown in FIG. 11.

When a control signal is input through a terminal 17 shown in FIG. 2, the edge generating circuits 18 and 19 turns off pre-edge processing so as not to add edges, executes upper-edge processing to add an edge above the key signal, executes lower-edge processing to add an edge below the key signal, or executes upper- and lower-edge processing to add edges above and below the key signal. That is, the maximum-value selectors 15 and 16 perform one of the following four operations in response to the control signal.

(1) To turn pre-edge processing off, that is, to execute no edge addition processing, the maximum-value selector 15 constantly selects the signal A1 while the maximum-value selector 16 constantly selects the signal B1.

(2) To execute the upper-edge processing, the maximum-value selector 15 constantly selects from the signals A1 and B1 while the maximum-value selector 16 constantly selects from the signals B1 and A0.

(3) To execute the lower-edge processing, the maximum-value selector 15 constantly selects between the signals A1 and B2 while the maximum-value selector 16 constantly selects between the signals B1 and A1.

(4) To execute the upper- and lower-edge processing, the maximum-value selector 15 constantly selects among the signals A1, B1, and B2 while the maximum-value selector 16 constantly selects among the signals A0, A1, and B1.

The addition of two edges below a key signal, that is, the use of each of the two edge generating circuits 18 and 19 to add two edges is explained with reference to FIGS. 3a to 3c.

Figure 3:
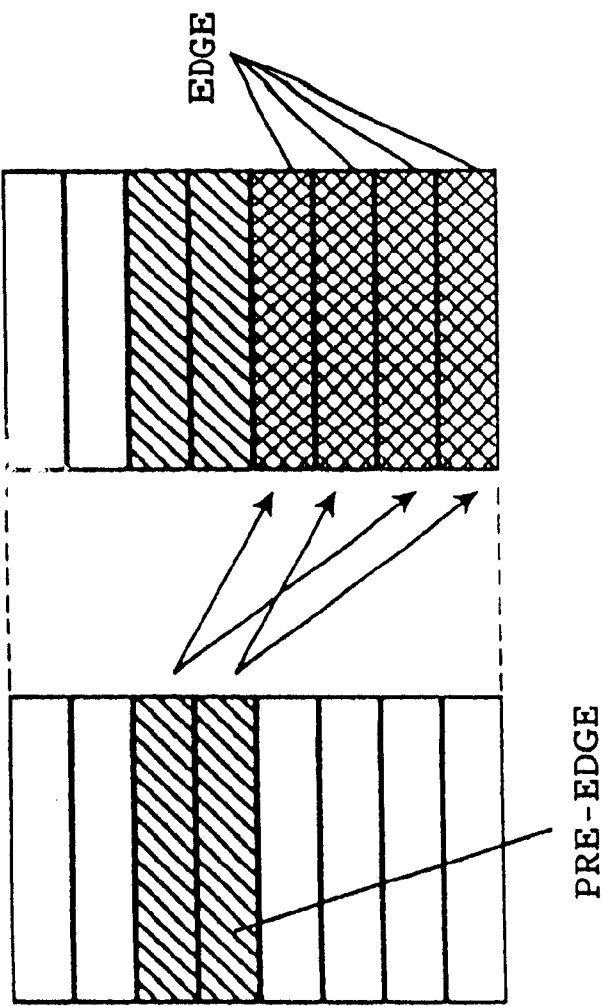
FIGS. 3a to 3c are conceptual drawings of an image signal indicating an operation of the edge key generating apparatus.

In FIG. 3a, a key signal is assumed to be in a line (k).

When the line (k) is a signal of the link A, the key signal is selected as the output from the maximum-value selector 15 only when the output from the line delay circuit 12, that is, the signal A1 corresponds the line (k). The key signal is also selected as the output from the maximum-value selector 16 only when the signal A1 corresponds the line (k).

As a result, a pre-edge is added to a line (k+1) on the link B side, as shown in FIG. 3b. Then in each sequence, two edges are added based on the key signals in the line (k) and (k+1), as shown in FIG. 3c.

In addition, if the line (k) is a signal of the link B, the key signal is selected as the output from the maximum-value selector 15 only when the signal B2 corresponds the line (k). The key signal is selected as the output from the maximum-value selector 16 only when the signal B1 corresponds the line (k). As a result, a pre-edge is added to the line (k+1) on the link A side as shown in FIG. 3b. Then in each sequence, two edges are added based on the key signals in the line (k) and (k+1), as shown in FIG. 3c.

Next, the addition of two edges above a key signal is explained with reference to FIGS. 4a to 4c.

Figure 4:
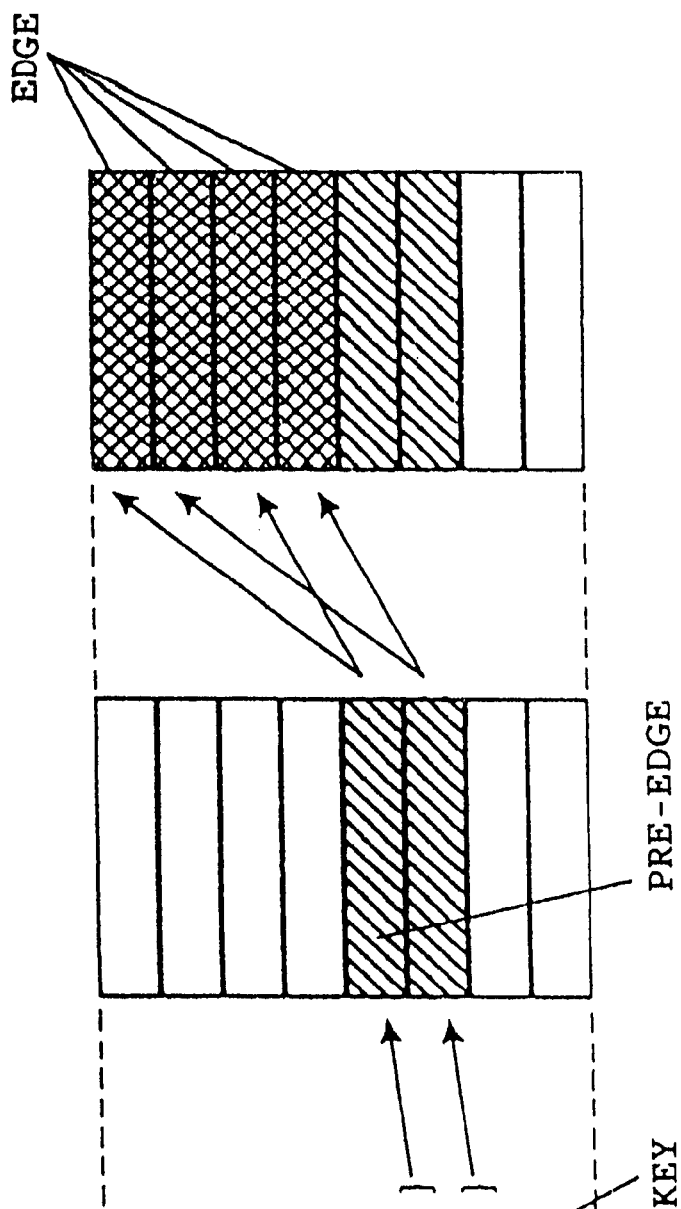
FIGS. 4a to 4c are conceptual drawings of an image signal indicating an operation of the edge key generating apparatus.

In FIG. 4a, a key signal is assumed to be in a line (k). When the line (k) is a signal of the link A, the key signal is selected as the output from the maximum-value selector 15 only when the signal A1 corresponds the line (k). The key signal is selected as the output from the maximum-value selector 16 only when the signal A0 corresponds the line (k). As a result, a pre-edge is added to a line (k−1) on the link B side, as shown in FIG. 4b.

Then in each sequence, two edges are added based on the key signals in the line (k) and (k−1), as shown in FIG. 4c.

In addition, if the line (k) is a signal of the link B, the key signal is selected as the output from the maximum-value selector 15 only when the signal B1 corresponds the line (k). The key signal is selected as the output from the maximum-value selector 16 only when the signal B1 corresponds the line (k). As a result, a pre-edge is added to the line (k−1) on the link A side as shown in FIG. 4b. Then in each sequence, two edges are added based on the key signals in the line (k−1) and (k), as shown in FIG. 4c.

Next, the addition of two edges above and below a key signal is explained with reference to FIGS. 5a to 5c.

Figure 5:
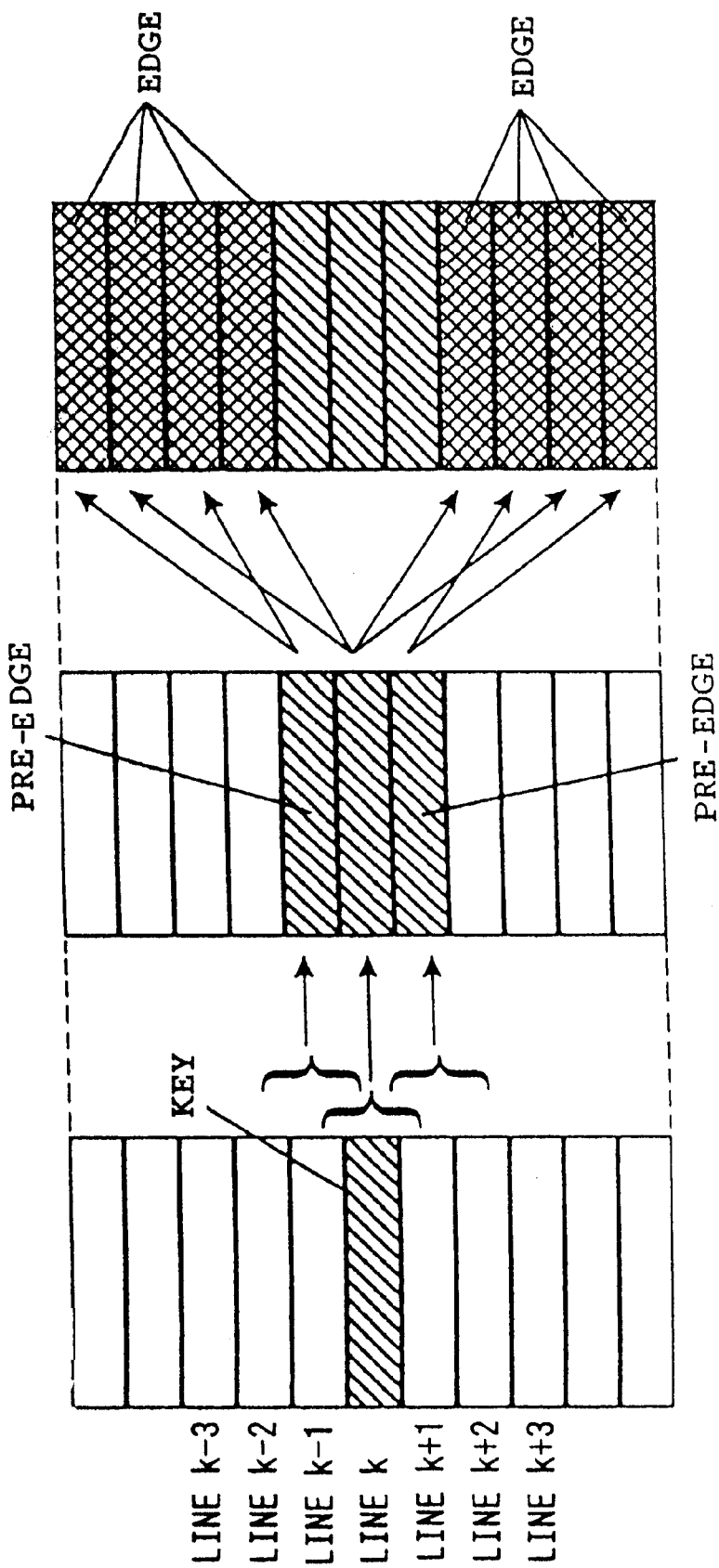
FIGS. 5a to 5c is a conceptual drawing of an image signal indicating an operation of the edge key generating apparatus.

In FIG. 5a, a key signal is assumed to be in a line (k). When the line (k) is a signal of the link A, the key signal is selected as the output from the maximum-value selector 15 only when the signal A1 corresponds the line (k). The key signal is selected as the output from the maximum-value selector 16 only when the signal A0 or A1 corresponds the line (k). As a result, pre-edges are added to lines (k−1) and (k+1) on the link B side, as shown in FIG. 5b. Then in each sequence, two edges are added based on the key signals in the lines (k−1), (k) and (k+1), as shown in FIG. 5c.

In addition, if the line (k) is a signal of the link B, the key signal is selected as the output from the maximum-value selector 15 only when the signal B1 or B2 corresponds the line (k). The key signal is selected as the output from the maximum-value selector 16 only when the signal B1 corresponds the line (k). As a result, pre-edges are added to the lines (k−1) and (k+1) on the link A side as shown in FIG. 5b. Then in each sequence, two edges are added based on the key signals in the lines (k−1), (k), and (k+1), as shown in FIG. 5c.

Thus, according to this embodiment, by pre-edge processing a progressive image signal that is separated into lines, conventional edge generating circuits can be used for the subsequent processing similar to the interlaced image signal. Thus, this embodiment enables the progressive image signal to be conveniently used.

Embodiment 2

Figure 6:
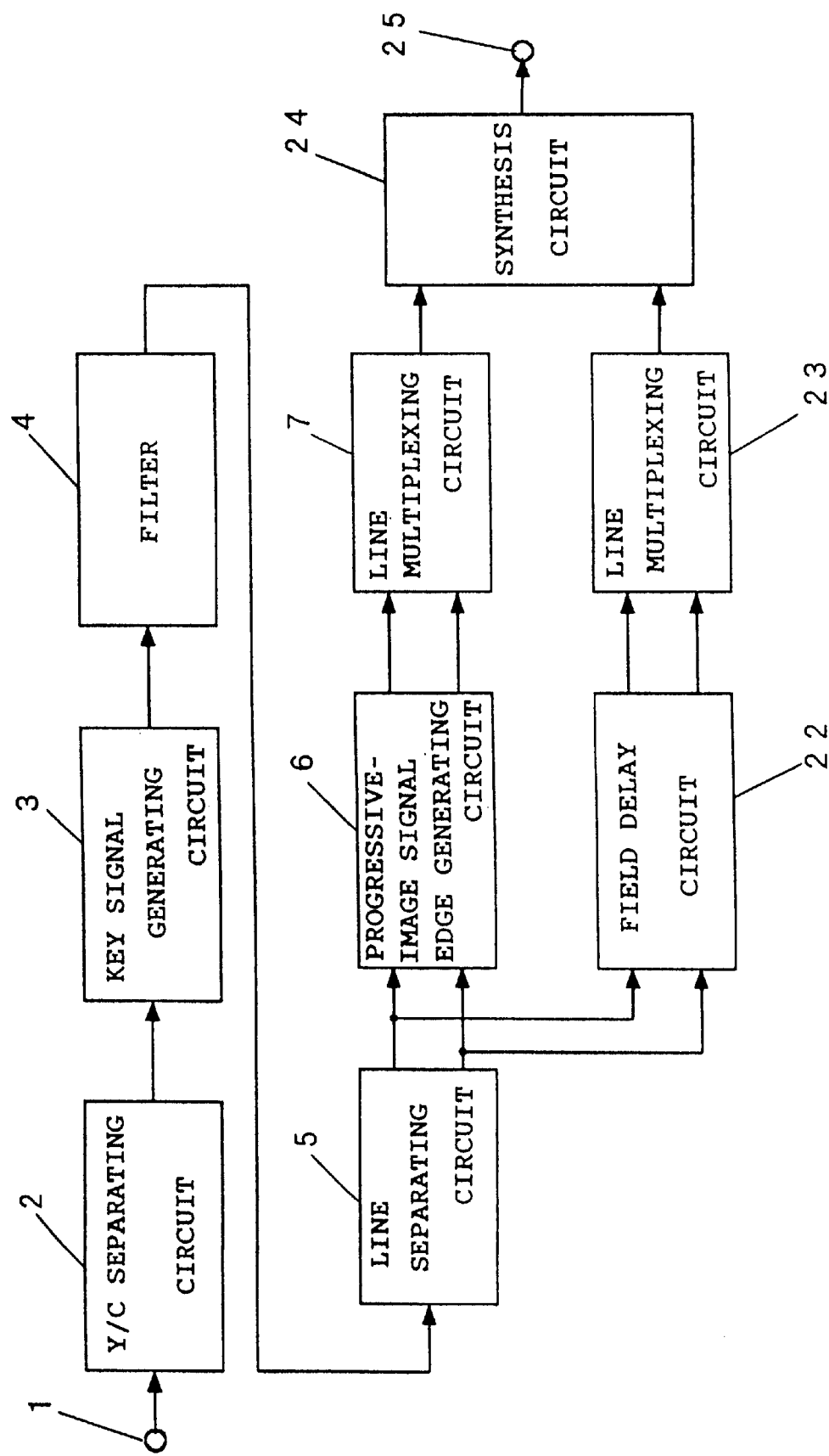
FIG. 6 is a block diagram showing a configuration of an edge key generating apparatus according to Embodiment 2 of this invention.

FIG. 6 is an edge key generating apparatus according to Embodiment 2 of this invention.

According to Embodiment 2, a field delay circuit 22, a line multiplexing circuit 23, and a synthesis circuit 24 are added to Embodiment 1. Reference numeral 25 denotes an output terminal of the synthesis circuit 24. Only those features of Embodiment 2 that are different from those of Embodiment 1 are described.

Embodiment 2 is intended to separately handle an original key signal and added edges. That is, this embodiment enables only a key signal to be removed from an edge signal formed by adding edges to this key signal and also enables an original image signal to be fitted in the key signal.

In FIG. 6, 22 is a field delay circuit that delays signals from the line separating circuit 5 in lines A and B by 32 one field period; 23 is a line multiplexing circuit that multiplexes back into an original progressive image signal, the delayed signals in the lines A and B output from the field delay circuit 22; and 24 is a synthesis circuit that synthesizes the outputs from the line multiplexing circuits 7 and 23 in a desired manner.

Figure 7:
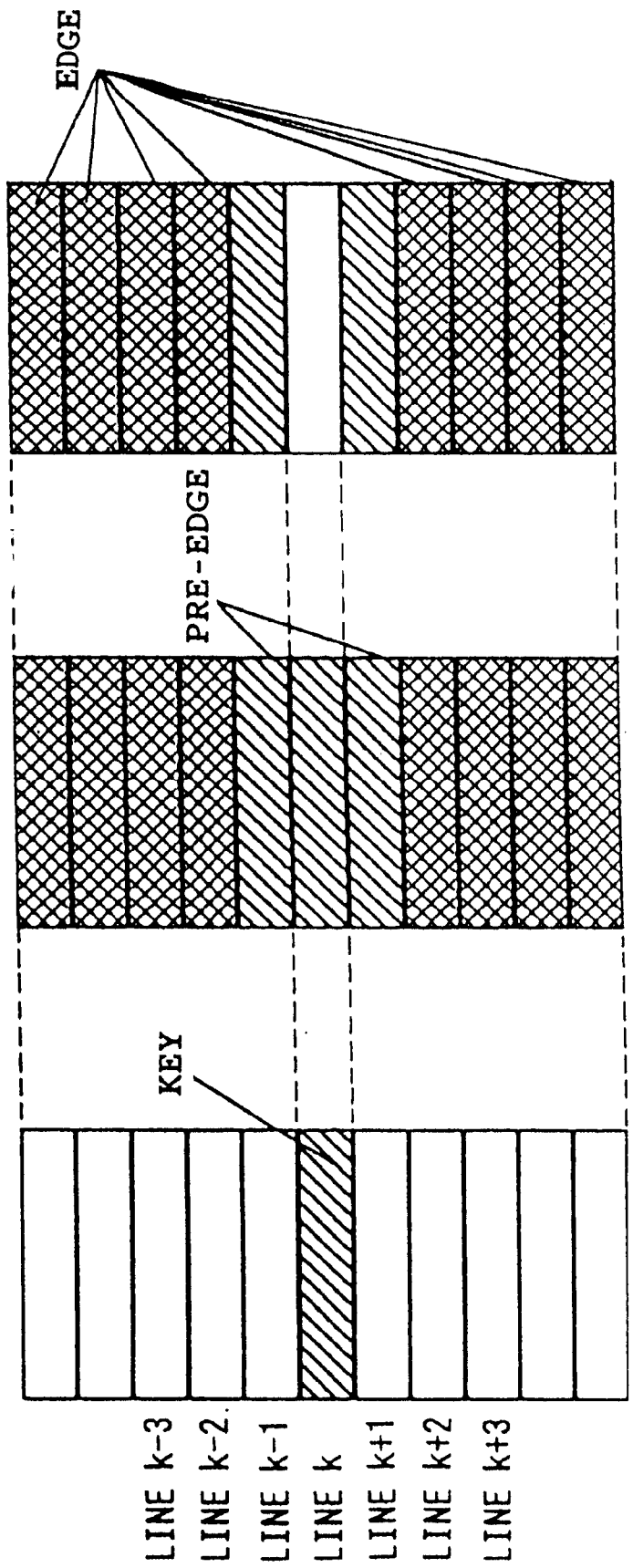
FIGS. 7a to 7c are conceptual drawings of an image signal indicating an operation of the edge key generating apparatus.
Figure 8:
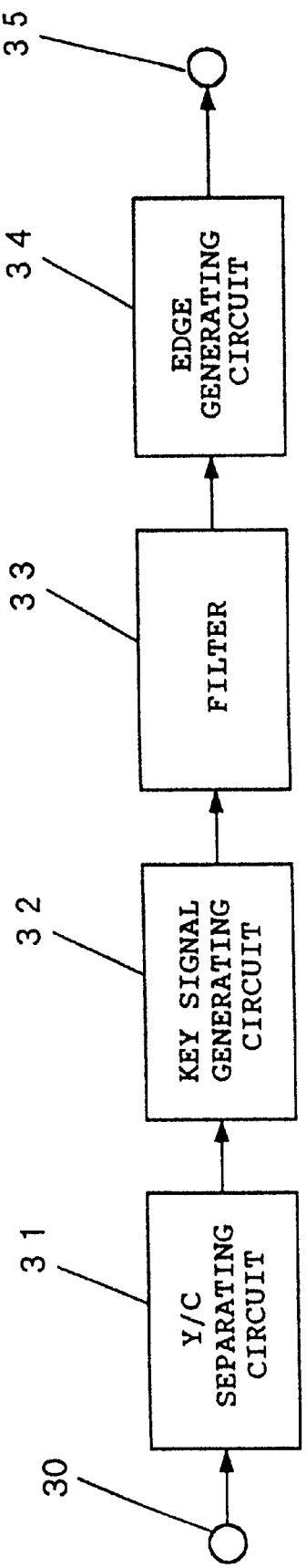
FIG. 8 is a block diagram showing a configuration of a conventional edge key generating apparatus.
Figure 9:
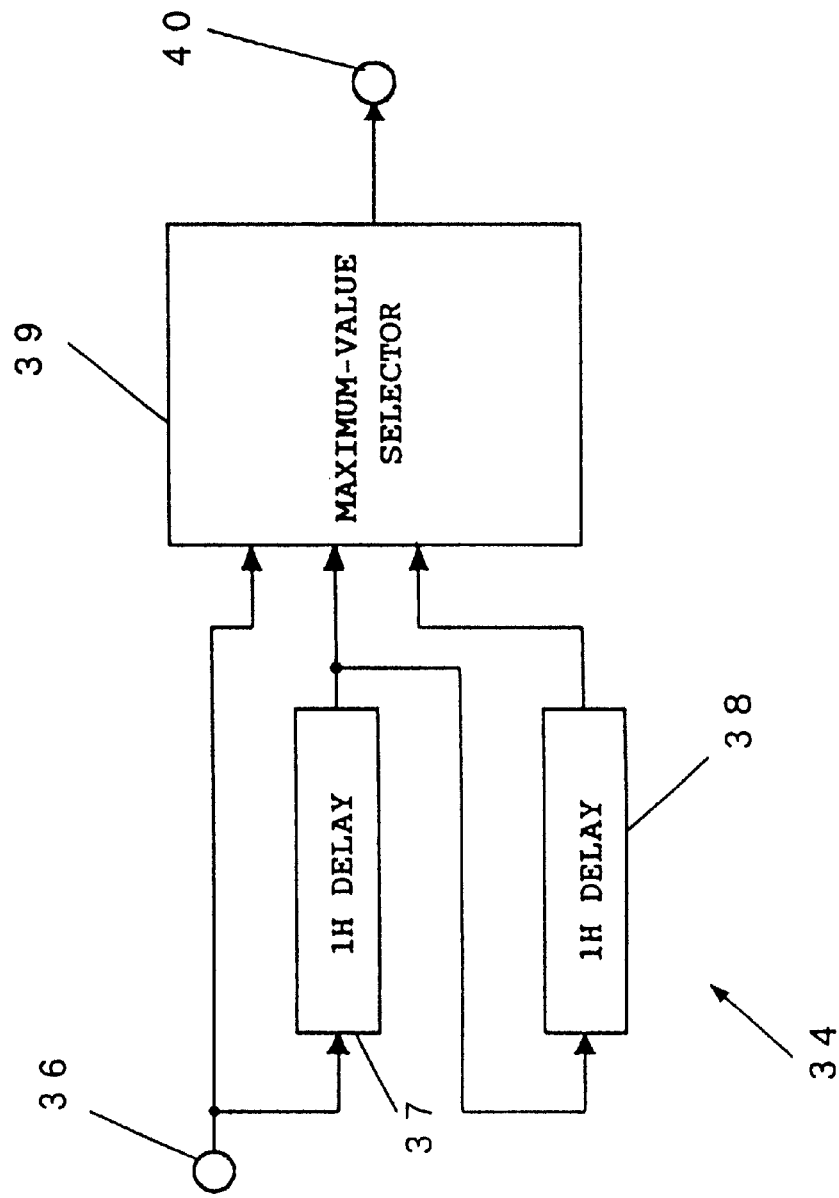
FIG. 9 shows a configuration of an edge generating circuit in the edge key generating apparatus.
Figure 10B:
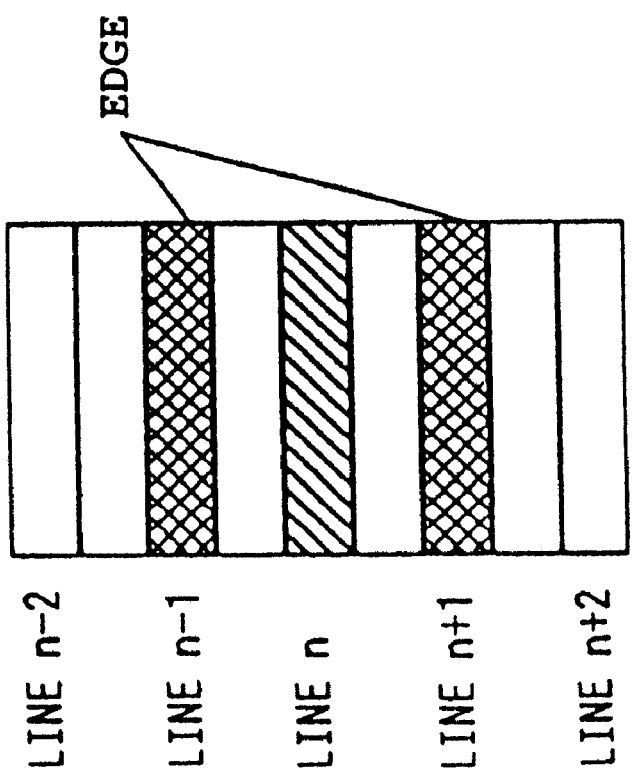
FIGS. 10a and 10b are conceptual drawings of an image signal indicating an operation of the edge key generating apparatus.
Figure 10A:
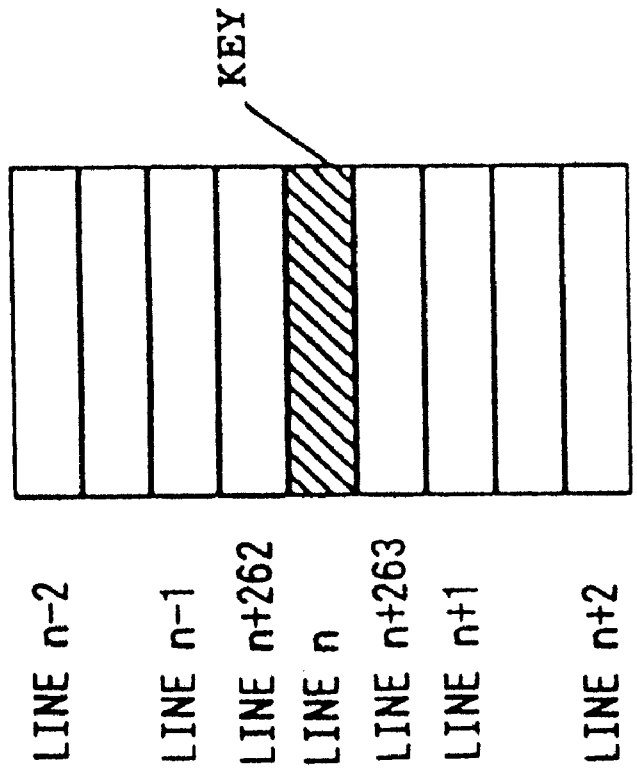

FIGS. 7a to 7c show an operation of the configuration in FIG. 6.

FIGS. 7a to 7c show that a key signal is in a line (k) and that this key signal is removed from an edge signal formed by adding edges based on the original key signal.

FIG. 7a is a key signal from the line separating circuit 5 which appears in the line (k). For explanation, this figure describes the lines A and B together. The progressive image signal edge generating circuit 6 adds pre-edges to lines (k−1) and (k+1), and each of the lines A and B adds two edges above and below the pre-edges (four in total). Thus, the output from the line multiplexing circuit 7 is as shown in FIG. 7b. The key signal shown in FIG. 7a is removed by the synthesis circuit 24 via the field delay circuit 22 and line multiplexing circuit 23. This operation enables a signal consisting the pre-edges and edges to be obtained as shown in FIG. 7c.

As described above, Embodiment 2 enables the original key signal to be handled separately from the edge signal, so the edge generating circuits of the interlaced image signal can be used in parallel to execute edge generation processing on the progressive image signal without inconvenience from pre-edge processing.

What is claimed is:

1. An edge key generating method for progressive image signals, comprising executing pre-edge processing that generates on a horizontal scanning line above or below a key signal a key signal equivalent to said key signal;

executing edge addition processing on the output from said pre-edge processing which output includes two sequences of signals each appearing on every other horizontal scanning line; and line multiplexing to obtain a progressive image signal to which edges have been added.

2. An edge key generating method, comprising executing pre-edge processing that generates on a horizontal scanning line above or below a key signal a key signal equivalent to said key signal; and executing edge addition processing on the output from said pre-edge processing which output includes two sequences of signals each appearing on every other horizontal scanning line; wherein the method synthesizes the key signal prior to the pre-edge processing and the key signal after the edge addition processing.

3. An edge key generating apparatus comprising:

a pre-edge processing circuit that generates on a horizontal scanning line above or below a key signal a key signal equivalent to said key signal to output two sequences of signals each appearing on every other horizontal scanning line;

a first edge generating circuit that executes edge addition processing on one of the signals in the output from said pre-edge processing circuit; and a second edge generating circuit that executes edge addition processing on the other signal in the output from the pre-edge processing circuit.

4. An edge key generating apparatus for progressive image signals according to claim 3, further comprising a line multiplexing circuit that line-multiplexes the output from the first edge generating circuit and the output from the second edge generating circuit to obtain a progressive image signal to which edges have been added.

5. An edge key gene rating apparatus According to claim 3, further comprising a synthesis circuit that synthesizes a key signal that is an input signal to the pre-edge processing circuit and the outputs from the first and second edge generating circuits after edge addition processing.

* * * * *